Patented Oct. 18, 1938

2,133,287

UNITED STATES PATENT OFFICE 2,133,287

ALKYL PHENOL COMPOUNDS

Lawrence H. Flett, Hamburg, N. Y., assignor to National Aniline & Chemical Company, Inc., New York, N. Y., a corporation of New York No Drawing. Application September 25, 1935, Serial No. 42,156

17 Claims. (Cl. 260—512)

This invention relates to new alkyl derivatives of phenol compounds. It relates more particularly to new alkyl phenol compounds in which an alkyl radical containing at least 12 carbon atoms is directly linked to a carbon atom of the phenol nucleus, and to methods of producing them.

The alkyl phenol compounds of the present invention correspond with the general formula

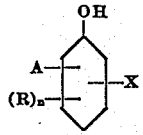

in which A represents hydrogen or a methyl group; R represents a branched-chain alkyl hydrocarbon radical containing at least 12 carbon atoms (preferably 12 to 23, and especially 14 to 19, carbon atoms); $n$ represents 1 or 2, preferably 1; and X represents hydrogen or the radical —$SO_2OM$, in which M represents hydrogen or a metal or an ammonium or organic ammonium radical, the radical represented by R having one of the formulas

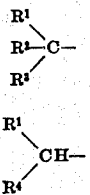

and in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms.

The said alkyl phenol compounds can be prepared, in accordance with one method of procedure forming a part of the present invention, by condensing phenol (or a cresol) with an alcohol containing at least 12 carbon atoms, preferably 12 to 23 carbon atoms, and especially 14 to 19 carbon atoms, said alcohol being a tertiary alcohol, or a secondary alcohol having the formula:

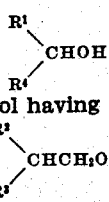

or a primary alcohol having the formula:

$$R^1 \diagdown$$
$$\phantom{R^1}CHCH_2OH$$
$$R^3 \diagup$$

for production of the alkyl phenols, and followed by sulfonation of the resulting alkyl phenol, for production of the alkyl phenol sulfonates. $R^1$, $R^2$, $R^3$ and $R^4$ having the meaning hereinbefore given.

The said phenol and sulfonic acid compounds are derivatives of phenol (hydroxybenzene) and of the cresols (1.2-, 1.3-, and 1.4-methyl-hydroxybenzene) in which the alkyl hydrocarbon radical represented by R in the foregoing formula is directly linked to a nuclear carbon atom and in which the sulfonic acid group, when present, is also directly linked to a nuclear carbon atom. In the case of phenol (when A represents hydrogen in the above formula), the alkyl hydrocarbon radical represented by R in the above formula is for the most part oriented para to the hydroxyl group. In the case of the cresols (when A represents a methyl group) the hydrocarbon radical represented by R is ortho or para to the hydroxyl group. For convenience the sulfonic acid compounds will be hereinafter referred to as "alkyl phenol sulfonates" which term generically includes the phenol and cresol derivatives, whether in the form of the free acids or the salts.

The said alkyl phenol sulfonates may be used instead of the usual soaps for scouring, cleaning, washing and toilet purposes as well as for other purposes for which ordinary soaps have heretofore been employed. They may also be employed in conjunction with ordinary soaps, since it has been found that they prevent objectionable precipitates from forming in hard water or in acid treating baths or in salt baths. They have the further advantages of being in general better wetting agents and more soluble than the usual soaps, and of leaving the washer goods with a soft feel. Inasmuch as water solutions of them in the form of their alkali metal salts are neutral in reaction, the latter may be safely used for the washing of delicate silks and other fine fabrics as well as for personal toilet purposes. The said alkyl phenol sulfonates are also valuable wetting agents useful in the textile and related fields and as insecticidal, fungicidal, emulsifying, dispersing, and/or tanning agents.

As condensing agents there may be employed anhydrous zinc chloride, anhydrous aluminum chloride, anhydrous antimonic chloride, anhydrous ferric chloride, zinc, etc. Zinc chloride is preferred as the condensing agent.

As sulfonating agents there may be employed sulfuric acids of various strengths (e. g., 66° Bé. sulfuric acid, sulfuric acid monohydrate, oleum), chlorsulfonic acid, etc. The sulfonation may be carried out with the aid of heating or cooling, as required, depending upon the ease of the sulfonation of the alkyl phenol or cresol and the sulfonating power of the sulfonating agents. The sulfonation of the alkyl phenol or cresol may be carried out to an extent such that mainly one, or more or less than one, sulfonic acid group is present in the final product (based on the alkyl phenol compound), it depending upon the properties desired of the final product, as will appear more fully hereinafter.

The alkyl phenol sulfonates may be prepared in accordance with the present invention in the form of their free sulfonic acids or in the form of salts or metals (as for example, of the alkali metals) or of organic bases, or of ammonia, etc. The salts may be obtained in any suitable manner, for example by reacting the sulfonated product, either in the crude form resulting from the sulfonation or in the purified form, with a metal oxide or hydroxide, ammonia or an organic base, or of a suitable salt of one of these, in an amount adapted to form a neutral product. Among the bases, oxides and salts which may be combined with the sulfonated products to produce salts useful as detergents and otherwise are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; diamino pronanol; ethylenediamine; triethylene tetramine; etc.

The invention will be illustrated by the following specific examples. It will be realized by those skilled in the art that the invention is not limited thereto, however, except as indicated in the appended patent claims. The parts are by weight and temperatures are in degrees centigrade.

*Example 1.*—100 parts of crude pentadecyl alcohol having the probable formula

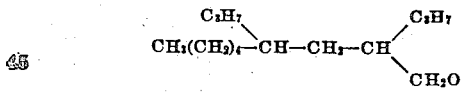

100 parts of phenol and 100 parts of anhydrous zinc chloride are refluxed for 10 to 16 hours. The reaction product is washed with water and then with dilute hydrochloric acid. The washed product is fractionally distilled in vacuo. The fraction boiling between 200° to 245° at .15 mm. pressure, of which the major portion distills between 210° and 220° at said pressure, is separately collected. It constitutes mainly a para-pentadecyl phenol having the probable formula

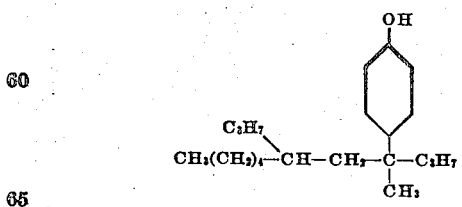

100 parts of the pentadecyl phenol are treated with a mixture of 142 parts of 100% sulfuric acid and 37 parts of 66° Bé. sulfuric acid, keeping the mixture agitated at about 95° C. The mix is stirred at this temperature for about 15 minutes or until a sample is soluble in water and a neutral 0.2 per cent solution does not precipitate more than a trace of calcium salts from a calcium chloride solution equivalent to approximately 0.224 grams calcium oxide per liter. The mass is diluted with water, neutralized with soda ash, filtered and evaporated to dryness. The resulting product, in which sodium sulfate is present, comprises a tertiary pentadecyl phenol sulfonate having the probable formula:

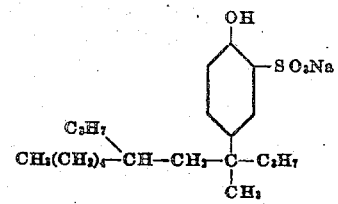

The mass may be diluted with 80% alcohol to a volume of approximately 500 volume parts, neutralized with caustic soda, filtered and evaporated to dryness to obtain a product comparatively free from salts of inorganic acids.

*Example 2.*—100 parts of tricosanol-7

100 parts of phenol and 100 parts of anhydrous zinc chloride are refluxed for 17 hours. The resulting pale oil is washed with warm, dilute hydrochloric acid and then with hot water. The washed oil is fractionally distilled and the fraction boiling between 275 to 285° at 13 mm. pressure is separately collected. It comprises secondary tricosyl phenol. 100 parts of the resulting tricosyl phenol are treated with 222 parts of 66° Bé. sulfuric acid at 95° with agitation and held at that temperature for about one hour, or until a sample is soluble in water and does not precipitate lime salts from dilute solutions. The product is diluted, neutralized with caustic soda, filtered, evaporated to dryness, and if desired, is further purified as described herein. It comprises a secondary-alkyl phenol sulfonate containing 23 carbon atoms in a branched alkyl chain.

*Example 3.*—100 parts of the mixture of alcohols resulting from the treatment of 1 mol equivalent of cetyl palmitate with 2 mol equivalents of methyl magnesium bromide (Grignard reagent), followed by hydrolysis, 100 parts of phenol, and 100 parts of anhydrous zinc chloride are refluxed for 17 hours. The resulting oil is washed with dilute hydrochloric acid and then with water. The washed oil is fractionally distilled and the fraction boiling between 225 to 260° at 13 mm. pressure, of which the major portion boils between 230 and 240° at 13 mm. pressure, is separately collected. It consists principally of a mixture comprising para-alpha-alpha-dimethyl cetyl phenol and para-alpha-methyl pentadecyl phenol. To 100 parts of the resulting mixture of alkyl phenols are added 64 parts of 65% oleum while the mixture is agitated and the temperature is held under 30°. After oleum addition is complete, temperature is raised to 40° and held there until a sample of the sulfonation mixture is soluble in water and a neutral 0.2 per cent solution does not cause appreciable precipitation of calcium salts; about one hour at 40° is usually sufficient. The mix is diluted, neutralized with caustic soda, filtered and dried in the usual manner. The diluted sulfonate solution or the dry sulfonate may be treated with alcohol (to separate salts of inorganic acids) and a small amount of animal charcoal (to decolorize). The alcohol extract is filtered and evaporated to yield an almost white, readily soluble, sulfonate.

The product is a mixture comprising tertiary and secondary phenol sulfonates in which the tertiary alkyl group is chiefly

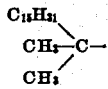

and the secondary group is chiefly

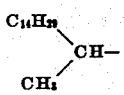

These respective alkyl groups occupy for the most part, a para-position, and the sulfonic acid group an ortho-position, to the hydroxyl group in these alkyl phenol sulfonates.

*Example 4.*—100 parts of a mixture of alcohols obtained by reacting amyl magnesium bromide with a mixture of isobutyl esters of the fatty acids derived from cocoanut oil, followed by hydrolysis and distillation, 100 parts of phenol and 100 parts of zinc chloride are refluxed for 17 hours. The resulting oil is washed with dilute hydrochloric acid and then with water. The washed oil is fractionally distilled and the fraction boiling between 270 and 290° at 14 mm. pressure is separately recovered. It constitutes a mixture of tertiary alkyl phenols having the probable formula

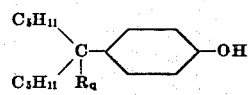

wherein $R_q = C_9H_{19}$ to $C_{17}H_{35}$. 100 parts of this mixture of alkylated phenols are treated with 64 parts of 65% oleum at 30°. The mixture is thoroughly agitated; the temperature is permitted to rise to 50° and held there until a sample of the sulfonation mixture is soluble in water and a neutral 0.2 per cent solution does not precipitate calcium salts (about 1 hour). The sulfonation mixture is then diluted, neutralized with caustic soda, filtered (alcohol-treated and decolorized, if desired), and evaporated to dryness. The product is a mixture of tertiary alkyl phenol sulfonates having the probable formula

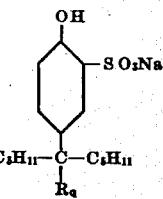

wherein $R_q = C_9H_{19}$ to $C_{17}H_{35}$.

It will be realized by those skilled in the art that changes may be made in the products, and in the processes of preparing them, hereinbefore described, without departing from the scope of the invention.

Thus, phenol, ortho-, meta-, or para-cresol or their mixtures may be employed.

The proportion of alcohol employed with respect to the phenol may vary; but preferably the amount employed is such that not more than two alkyl radicals of the type represented by R in the foregoing formula, and preferably only one of said alkyl radicals, is contained in the resulting alkyl phenol. Thus, at least 1.25 mols of phenol per mol of alcohol is preferably employed in the condensation. A ratio as low as 1 to 1 may be employed, but the yield of the resulting alkyl phenol containing one alkyl radical of the said type represented by R will be less.

The amount of condensing agent employed may vary over a wide range. In using zinc chloride as the condensing agent, about an equal weight of the zinc chloride and the alcohol is preferably employed for best results; but more or less than this amount may be used. While the zinc chloride and other metal halide condensing agents mentioned have been referred to as "anhydrous", it is noted that said condensing agents may be employed in a partially hydrated condition containing small amounts of water, for instance, such as are absorbed from the surrounding atmosphere or otherwise in commercial operation, but insufficient to interfere with their action as condensing agents.

The time during which the condensation reaction of the alcohol and phenol may be carried out also may be varied. For example, a satisfactory yield of alkyl phenol in general can be obtained by heating the alcohol, the phenol and anhydrous zinc chloride at refluxing temperature conditions for about 7 hours and at lower temperatures for correspondingly longer periods of time. The quality of the recovered alkyl phenols and the detergency of the alkyl phenol sulfonates produced therefrom appear to be improved however by carrying out the heating for a longer period of time. With zinc chloride as the condensing agent, the period of heating at refluxing temperatures may be extended to 16 hours or more without seriously harming the quality or substantially decreasing the yield of the alkyl phenol, and at a temperature of about 135° C. the period of heating may similarly be 30 hours or more.

The crude alkyl phenol resulting from the condensation is preferably purified, as for example, by fractional distillation and collecting a middle fraction having in general a boiling point range of not more than 100° C., and the purified compound is preferably employed for sulfonation when the product is to be employed as a detergent, in view of the resulting superior detergent properties. Distillation is preferably carried out at a pressure not exceeding 30 mm. to avoid decomposition. The preferred sulfonated products are made from a distilled or relatively pure alkyl phenol.

The alkyl phenols of the present invention are viscous oils having a brown to white color. They are insoluble in water but soluble in various organic solvents.

The sulfonation may be carried out in the presence or absence of an inert organic solvent or diluent and in the presence or absence of a sulfonation assistant. As solvents or diluents there may be employed any inert organic liquid which is not readily sulfonated, such as halogenated hydrocarbons of the aliphatic and aromatic series, as for example, carbon tetrachloride, dichlorethane, tetrachlorethane, dichlorbenzene, etc. When an inert solvent or diluent is used, it may be separated from the alkaline aqueous solution of the sulfonic acid salt of the alkyl phenol which results upon diluting the sulfonation mass with water and neutralizing or it may be separated in the process of drying said salt. As sulfonation assistants there may be employed the lower organic acids and/or their anhydrides, as for example, acetic acid, acetic anhydride, etc.

The temperature at which the sulfonation is carried out may vary within wide limits. For example, temperatures as low as about 0° C. and as high as about 140° C. may be employed. In general the more vigorous the sulfonating agent the lower is the preferred temperature. Ordinarily, the completion of the sulfonation is carried out at a temperature in the neighborhood of about 25° to about 80° C. The ratio of sulfonating agent employed with respect to the alkyl phenol also may be varied. While the preferred amounts are given in the above examples, an amount of sulfuric acid or other sulfonating agent equivalent to from 1 to about 5 parts by weight of sulfuric acid monohydrate per part by weight of the alkyl phenol may be employed.

The extent to which the sulfonation is carried out may vary with the individual material being sulfonated and the use to be made of the sulfonated product. In general the extent of sulfonation of the alkyl phenol treated is such as to form chiefly the monosulfonic acid of the alkyl phenol, and to sulfonate impurities as well, if present.

The reaction mixtures resulting from the sulfonation of the alkyl phenol or cresol may also be directly employed for the formation of mixed products, as for example mixtures of salts of the alkyl phenol sulfonic acid and other acids present in said reaction mixtures, which mixtures of salts are also useful as such. Thus, the sulfonation reaction mixture resulting from the treatment of the alkyl phenol or cresol with an amount of sulfonating agent in excess of that theoretically required to effect the desired degree of sulfonation may be treated with a suitable inorganic or organic base or basic salt (as for example, one of those mentioned) and the resulting mixture of the salt of the sulfonated alkyl phenol or cresol and the organic or inorganic salt (as for example, sodium sulfate) may be jointly isolated from the reaction mixture and employed as such. If it is desired to produce a salt of the sulfonated alkyl phenol or cresol in a form substantially free from inorganic salts (for example, inorganic sulfates) this may be accomplished by taking advantage of the solubility of the salts of the sulfonated products in alcohol and other organic solvents as indicated in the above specific examples.

The sulfonated products in the form of metallic salts or salts of inorganic bases are usually yellowish to white, friable solids; and in the form of salts of organic bases vary from viscous oils to semi-solids to solids. In general, the salts are readily soluble in water and in aqueous (neutral, acid or alkaline) solutions to form solutions which are faintly colored brown or yellow, which are of a soapy nature and which foam readily. Certain of the salts, such as the salts of the aromatic monoamines and the aliphatic and aromatic polyamines, are oils which generally are insoluble in water apparently due to the presence of small amounts of impurities but are soluble in organic solvents (as for example, benzene, gasoline, etc.) and in aqueous solutions of alkalis (presumably by conversion to the salts of the alkalis).

It is to be understood that the invention includes products containing a plurality of alkyl phenol sulfonic acid nuclei linked together through the sulfonic acid groups by a polyvalent metal or organic basic radical, as well as products in which an alkyl phenol sulfonic acid is linked through the sulfonic acid group to a different acid compound by a polyvalent metal or organic basic radical.

Thus the invention comprehends compounds of the type $(X)_n\text{---}Z\text{---}(X')_n$ and $(X)_n\text{---}Z\text{---}(Y)_n$, wherein X and X' each represent the radical

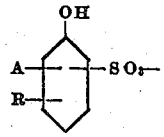

which may be the same or different, Z represents a polyvalent metal or organic base, Y represents a radical containing an acid group, $n$ represents a whole number, and A and R have the meaning defined above. Examples of such types of compounds are

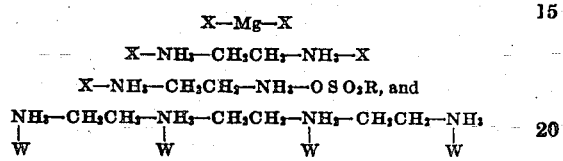

wherein X and R have the meaning defined above, and W represents a radical containing an acid group at least one of which is a radical of the type represented by X.

This application is a continuation-in-part of applications Serial Nos. 691,081 and 691,082, filed September 26, 1933.

I claim:

1. An alkyl phenol compound corresponding with the general formula

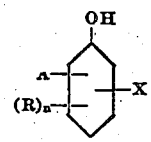

in which A represents a member of the group consisting of hydrogen and the methyl radical; R represents a branched-chain alkyl hydrocarbon radical containing at least 12 carbon atoms; $n$ represents an integer not greater than 2; and X represents one of the group consisting of hydrogen, and the radical —SO₂OM, in which M represents one of the group consisting of hydrogen, a metal, an ammonium radical, and an organic ammonium radical; the radical represented by R having one of the formulas

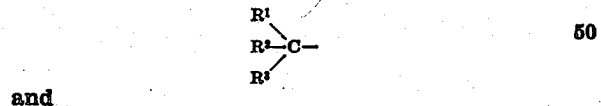

and

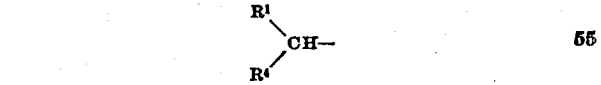

in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms.

2. An alkyl phenol compound corresponding with the general formula

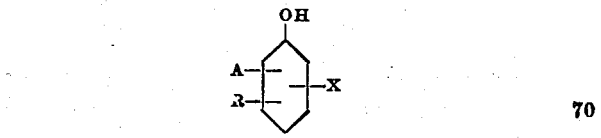

in which A represents a member of the group consisting of hydrogen and the methyl radical; R represents a branched-chain alkyl hydrocarbon radical containing at least 12 carbon atoms and in para position to the hydroxyl group when A represents hydrogen, and in one of the positions ortho and para to the hydroxyl group when A represents a methyl group; and X represents one of the group consisting of hydrogen and the radical —SO₂OM, in which M represents one of the group consisting of hydrogen, a metal, an ammonium radical, and an organic ammonium radical; the radical represented by R having one of the formulas

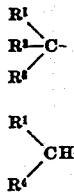

and in which R¹ represents an alkyl hydrocarbon radical containinng at least 7 carbon atoms in a straight chain, R² and R³ each represent an alkyl hydrocarbon radical, and R⁴ represents an alkyl hydrocarbon radical containing at least 2 carbon atoms.

3. An alkyl phenol corresponding with the general formula

in which A represents a member of the group consisting of hydrogen and the methyl radical and R represents a branched-chain alkyl hydrocarbon radical containing at least 12 carbon atoms, in para position to the hydroxyl group when A represents hydrogen and in one of the positions ortho and para to the hydroxyl group when A represents a methyl group, the radical represented by R having one of the formulas

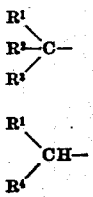

and in which R¹ represents an alkyl hydrocarbon radical containing at least 7 carbon atoms in a straight chain, R² and R³ each represent an alkyl hydrocarbon radical, and R⁴ represents an alkyl hydrocarbon radical containing at least 2 carbon atoms.

4. An alkyl phenol corresponding with the general formula

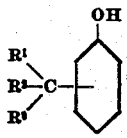

in which R¹ represents an alkyl hydrocarbon radical containing at least 7 carbon atoms in a straight chain, and R² and R³ each represent an alkyl hydrocarbon radical, the total number of carbon atoms in R¹, R² and R³ being at least 11.

5. An alkyl phenol sulfonate corresponding with the general formula

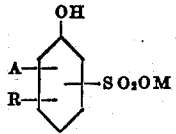

in which A represents a member of the group consisting of hydrogen and the methyl radical; R represents a branched-chain alkyl hydrocarbon radical containing at least 12 carbon atoms; and M represents one of the group consisting of hydrogen, a metal, an ammonium radical, and an organic ammonium radical; the radical represented by R having one of the formulas

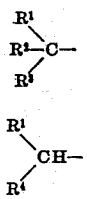

and in which R¹ represents an alkyl hydrocarbon radical containing at least 7 carbon atoms in a straight chain, R² and R³ each represent an alkyl hydrocarbon radical, and R⁴ represents an alkyl hydrocarbon radical containing at least 2 carbon atoms.

6. An alkyl phenol sulfonate corresponding with the general formula

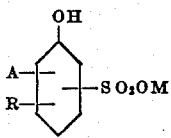

in which A represents a member of the group consisting of hydrogen and the methyl radical; R represents a branched-chain alkyl hydrocarbon radical containing at least 12 carbon atoms, in para position to the hydroxyl group when A represents hydrogen and in one of the positions ortho and para to the hydroxyl group when A represents a methyl group; and M represents one of the group consisting of hydrogen, a metal, an ammonium radical, and an organic ammonium radical; the radical represented by R having one of the formulas

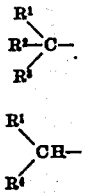

and in which R¹ represents an alkyl hydrocarbon radical containing at least 7 carbon atoms in a straight chain, R² and R³ each represent an alkyl hydrocarbon radical, and R⁴ represents an alkyl hydrocarbon radical containing at least 2 carbon atoms.

7. An alkyl phenol sulfonate corresponding with the general formula

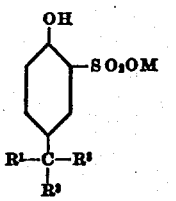

in which $R^1$ represents an alkyl hydrocarbon radical containing at least 7 carbon atoms in a straight chain, and $R^2$ and $R^3$ each represent an alkyl hydrocarbon radical, the total number of carbon atoms in $R^1$, $R^2$ and $R^3$ being at least 11, and M represents one of the group consisting of hydrogen, a metal, an ammonium radical, and an organic ammonium radical.

8. An alkyl phenol sulfonate corresponding with the general formula

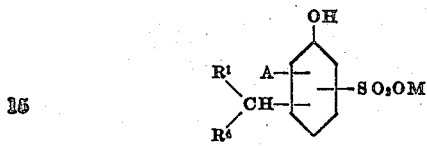

in which A represents a member of the group consisting of hydrogen and the methyl radical, $R^1$ represents an alkyl hydrocarbon radical containing at least 7 carbon atoms in a straight chain, $R^4$ represents an alkyl hydrocarbon radical containing at least 2 carbon atoms, and M represents one of the group consisting of hydrogen, a metal, an ammonium radical, and an organic ammonium radical, the total number of carbon atoms in $R^1$ and $R^4$ being at least 11.

9. A method of producing a nuclear alkyl derivative of a phenol, which comprises condensing a member of the group consisting of phenol and its monomethyl derivatives with an alcohol containing at least 12 carbon atoms and selected from the group consisting of tertiary alcohols, secondary alcohols having the formula

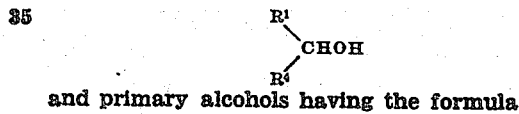

and primary alcohols having the formula

in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms, with the aid of a condensing agent.

10. A method of producing a nuclear alkyl derivative of a phenol, which comprises condensing one mol of a member of the group consisting of phenol and its monomethyl derivatives with not more than one mol. of an alcohol containing 12 to 23 carbon atoms and selected from the group consisting of tertiary alcohols, secondary alcohols having the formula

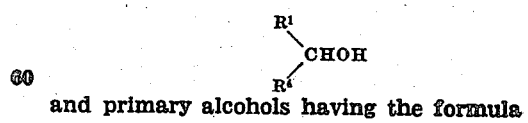

and primary alcohols having the formula

in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms, with the aid of zinc chloride as a condensing agent.

11. A method of producing a nuclear alkyl derivative of a sulfonated phenol, which comprises condensing one mol of a member of the group consisting of phenol and its monomethyl derivatives with not more than one mol of an alcohol containing at least 12 carbon atoms and selected from the group consisting of tertiary alcohols, secondary alcohols having the formula

and primary alcohols having the formula

in which $R^1$ represents a multicarbon alkyl hydrocarbon radical, $R^2$ and $R^3$ each represent an alkyl hydrocarbon radical, and $R^4$ represents an alkyl hydrocarbon radical containing at least 2 carbon atoms, with the aid of a condensing agent, and sulfonating the resulting product.

12. A method of producing a nuclear alkyl derivative of a sulfonated phenol, which comprises condensing one mol of a member of the group consisting of phenol and its monomethyl derivatives with not more than one mol of an alcohol containing 12 to 23 carbon atoms and selected from the group consisting of tertiary alcohols, secondary alcohols having the formula

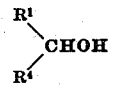

and primary alcohols having the formula

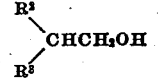

in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms, with the aid of a condensing agent, and sulfonating the resulting product.

13. A method of producing a nuclear alkyl derivative of a sulfonated phenol, which comprises condensing at least 1.25 mols of a phenol compound of the group consisting of phenol and its monomethyl derivatives with one mol of an alcohol containing 14 to 19 carbon atoms and selected from the group consisting of tertiary alcohols, secondary alcohols having the formula

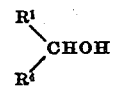

and primary alcohols having the formula

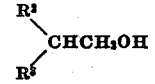

in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms, with the aid of a condensing agent, and sulfonating the resulting product.

14. A method of producing a nuclear alkyl derivative of a sulfonated phenol, which comprises condensing at least 1.25 mols of a phenol compound of the group consisting of phenol and its monomethyl derivatives with one mol of an alcohol containing 12 to 23 carbon atoms and selected from the group consisting of tertiary alcohols, secondary alcohols having the formula

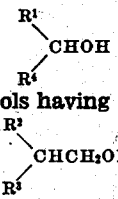

and primary alcohols having the formula

in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms, with the aid of zinc chloride as a condensing agent, and sulfonating the resulting product.

15. A method of producing a nuclear alkyl derivative of a sulfonated phenol, which comprises sulfonating an alkyl phenol corresponding with the general formula

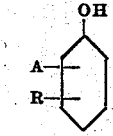

in which A represents a member of the group consisting of hydrogen and the methyl radical and R represents a branched-chain alkyl hydrocarbon radical containing at least 12 carbon atoms, in para position to the hydroxyl group when A represents hydrogen and in one of the positions ortho and para to the hydroxyl group when A represents a methyl group, the radical represented by R having one of the formulas

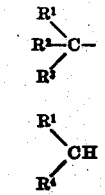

and in which $R^1$ represents an alkyl hydrocarbon radical containing at least 7 carbon atoms in a straight chain, $R^2$ and $R^3$ each represent an alkyl hydrocarbon radical, and $R^4$ represents an alkyl hydrocarbon radical containing at least 2 carbon atoms.

16. A method of producing a nuclear alkyl derivative of a sulfonated phenol, which comprises sulfonating an alkyl phenol corresponding with the general formula

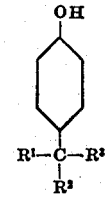

in which $R^1$ represents an alkyl hydrocarbon radical containing at least 7 carbon atoms in a straight chain, and $R^2$ and $R^3$ each represent an alkyl hydrocarbon radical, the total number of carbon atoms in $R^1$, $R^2$ and $R^3$ being at least 11.

17. A method of producing a nuclear alkyl derivative of a sulfonated phenol, which comprises sulfonating an alkyl phenol corresponding with the formula

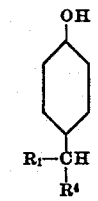

in which $R^1$ represents an alkyl hydrocarbon radical containing at least 7 carbon atoms in a straight chain, and $R^4$ represents an alkyl hydrocarbon radical containing at least 2 carbon atoms, the total number of carbon atoms in $R^1$ and $R^4$ being at least 11.

LAWRENCE H. FLETT.